Feb. 10, 1959 J. J. KNASKO 2,873,313

METHOD AND SYSTEM FOR ADJUSTING TELEVISION

Filed March 16, 1953

INVENTOR

Joseph J. Knasko

BY Parker and Walsh

ATTORNEYS 2,873,313

METHOD AND SYSTEM FOR ADJUSTING TELEVISION

Joseph J. Knasko, Ford City, Pa.

Application March 16, 1953, Serial No. 342,528

8 Claims. (Cl. 178—7.5)

This invention relates to a method and system for adjusting a television receiver, more particularly for adjusting the centering, height and width of the television picture.

More frequently than not a television receiver is installed in a purchaser's home at a time when there is no television test pattern on the air, or for that matter any picture at all. This occurrence is quite common and makes it particularly difficult for a television installation man to adjust the television receiver to the customer's satisfaction without having to return when a television test pattern is being transmitted. This condition commonly results in unneccesary service calls and accompanying waste of time and money.

Certain instruments are known in the art which allow a service man to apply a locally generated test pattern to the receiver for adjustment purposes. However these instruments are expensive, complicated, inconvenient to transport and require time to set up and attach to the television receiver.

Accordingly it is an object of the present invention to provide a novel method and system for adjusting a television receiver which does not entail the disadvantages of the prior art systems and methods.

A further object of the invention is to provide a method and system for adjusting a television receiver or similar device which requires no equipment except the receiver itself.

An additional object of the invention is to provide a method and system for adjusting a television receiver in which the necessary means for accomplishing the desired results are built into the receiver.

Still another object of the invention is to provide a novel method and system for adjusting the centering of a television image.

A further object of the invention is to provide a novel method and system for adjusting the size of a television picture.

Yet another object of the invention is to provide a method and system for adjusting a television receiver which does not require the transmission of a television test pattern or even of a television picture.

Figure 1:
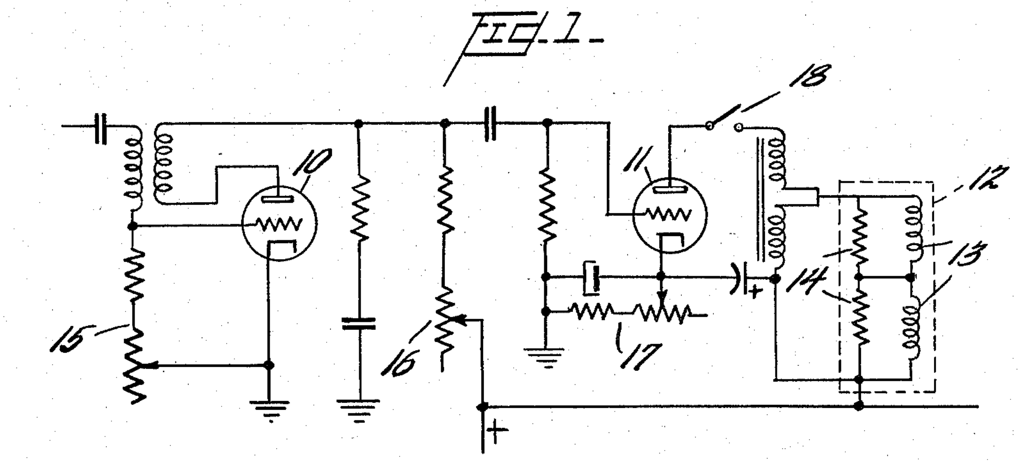
Figure 2:
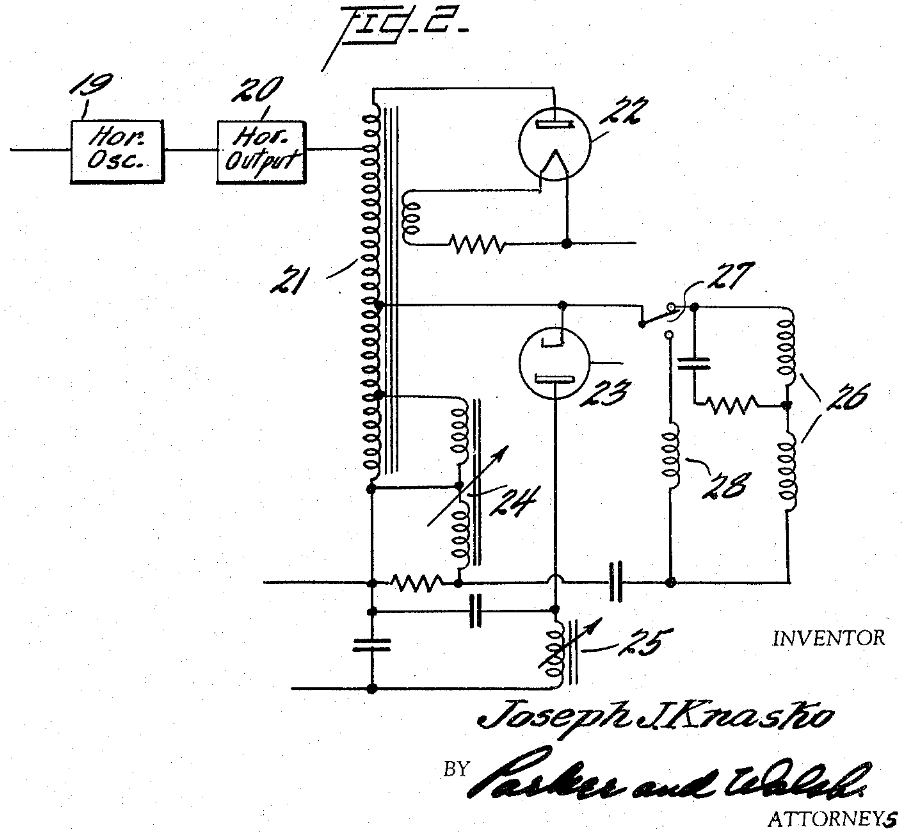

These and other objects of the invention are accomplished in a manner which may more easily be perceived from a consideration of the following specification taken in conjunction with the accompanying drawings wherein:

Figure 1 illustrates a portion of a conventional television receiver modified to include the elements of the invention and Figure 2 illustrates a separate section of a conventional television receiver modified to include the elements of the invention.

Briefly, the invention is based upon the concept of producing on the screen of the television receiver a horizontal line which may be adjusted in length and moved vertically and also producing a vertical line which may be adjusted in length and moved horizontally. The provision of these lines allows the adjustment of centering and size of the television image.

Referring now to Figure 1, 10 designates an oscillator tube of the type commonly employed in the vertical sweep circuits of television receivers, while 11 designates an output tube commonly associated with the oscillator. The output tube is coupled in a well known manner to the vertical deflection coil circuit of a cathode ray tube (not shown). The deflection coil circuit is generally designated 12 and includes inductance 13 and resistance 14. Associated with the oscillator and output circuits are conventional hold, height and linearity controls designated 15, 16, 17, respectively. The circuit illustrated is conventional, except for elements to be described hereinafter, and need not be described further.

Interposed in the plate circuit of the output tube 11 is a switch 18. The purpose of this switch, as will appear more fully below, is to disable the vertical sweep circuit.

Referring now to Figure 2, 19 and 20 designate respectively the horizontal oscillator and horizontal output circuits of a conventional television receiver, these elements being coupled to a flyback transformer 21 of the type well known in receivers employing electro magnetic deflection and flyback type high voltage supplies. A high voltage rectifier 22 and a damper tube 23 are coupled to the flyback transformer in a well known manner. Suitable width and linearity controls 24, 25, respectively, are provided as is known in the art. Coupled to the flyback transformer are the horizontal deflection coils 26. So far the circuit described is conventional and requires no elaboration. It will now be noted that a switch 27 is arranged to couple either the deflection coils 26 or an additional inductive element 28 to the flyback transformer. This switch may, as shown, be merely a single pole double throw switch properly connected.

In normal operation of the television receiver switch 18 remains closed and switch 27 remains in its upper position. However, should it be necessary to adjust the television image, switch 18 may be opened thereby disabling the vertical sweep circuit, and assuming that the horizontal sweep circuit is properly operating, a horizontal line will appear on the screen. By adjusting the vertical centering controls of the receiver this line may be moved up or down as may be required until it is properly centered and by adjusting the width control or the width and horizontal linearity controls the length of line may be adjusted until it properly spans the screen horizontally.

Next switch 18 may be reclosed and switch 27 moved to its downward position. Assuming that the vertical sweep circuit of the receiver is properly operating, a vertical line will then appear on the screen. By adjusting the horizontal centering controls this line may be properly centered, and by adjusting the height and vertical linearity controls the line may be lengthened or shortened until it just spans the screen vertically. If now switch 27 is returned to its upward position the television image, when transmitted, will be properly centered and have the correct vertical and horizontal dimensions.

It should be noted that the sequence of adjustments is not critical. The production of the horizontal line and the vertical line may be carried out in the reverse of the sequence described above. Moreover, the order of adjustment of size and centering may be reversed.

A distinction will be noted between the methods of disabling the vertical and horizontal sweep circuits as shown in Figures 1 and 2, respectively. In Figure 1 the plate circuit of the vertical output tube is broken, while in Figure 2 the horizontal deflection coils are disconnected and replaced by a separate inductive element 28. It will be clear to those skilled in the art that if the horizontal output circuit were interrupted in the manner of Figure 1, the flyback system would not operate in its normal manner and since the second anode voltage of the cathode ray tube is obtained from the flyback transformer, it is necessary to substitute for the deflection coils inductive element 28. Element 28 may be physically located as far as possible from the cathode ray tube and may be suitably oriented and shielded in order that its magnetic field will have little or no effect on the vertical line present on the television screen. In some instances a resistor may be used instead of inductance 28. If the particular television receiver under consideration utilizes a separate high voltage oscillator as is common in receivers employing electrostatic deflection, the horizontal sweep circuits may be interrupted in a manner similar to that shown in Figure 1.

It should be understood that the particular circuits illustrated are merely typical of television circuits commonly employed and are in no manner intended to limit the scope of the invention. Moreover, the particular switch arrangements illustrated are merely exemplary, and many variations will appear clear to those skilled in the art. For example in Figure 1 the switch may be inserted in the cathode circuit of the output tube or may be inserted in the oscillator circuit to disable the latter. The switch may be employed to connect a suitable bias source to either the oscillator or output tubes to bias the same far beyond cutoff and thereby prevent their operation. It may be desirable to employ double pole switches rather than single pole switches. In Figure 2, for example, double pole switches may be employed to disconnect both ends of the deflection coils from the flyback circuit. The details of the disabling schemes will depend on the particular receiver circuit. In some instances it may be desirable to shunt circuit elements with resistors or even to short circuit elements to produce the desired results.

In the arrangement of Figure 1 it may be desirable to insert a substitute element for the deflection coil instead of merely breaking the output circuit. This arrangement would maintain the circuit in substantially the same state as normal operating conditions and would eliminate any question of unbalancing the power supply, for example, or other elements of the over all receiver. The system of Figure 1 may accordingly be arranged so that a suitable resistor or inductance is connected in place of the deflection coils upon actuation of the switch 18.

It should also be noted that under certain circumstances the switches may be eliminated altogether. For example, in a receiver employing electrostatic deflection it may only be necessary to remove the oscillator or output tubes of the respective deflection circuits in order to produce the desired horizontal or vertical line. This method, while simple, would generally require the removal of the back of the receiver cabinet and consequently be more time consuming.

As stated previously it is an object of this invention to provide a novel system for adjusting a television receiver which system requires no external apparatus and merely utilizes equipment built into the receiver at the factory. Accordingly, it is proposed to mount the necessary switches at some convenient location, as on the rear of the chassis, in order that the switches will be easily accessible to the service man. Any of the many well known types of switches may be employed. The provision of switches as described above would make an insignificant difference in the cost of the receiver and yet would make adjustment of the receiver highly expedient.

The invention, while illustrated in connection with a television receiver may be employed in connection with any similar device. While a preferred embodiment has been shown and described, the principles of the invention may be applied to many modifications as will appear evident to those skilled in the art.

I claim:

1. The method of adjusting an image reproducer having a screen and a pair of orthogonal deflection circuits, which includes the steps of rendering one of said deflection circuits inoperative thereby producing a substantially uni-dimensional image, adjusting a characteristic of said image, rendering said one deflection circuit operative, rendering the other of said deflection circuits inoperative thereby producing a substantially uni-dimensional image, adjusting a characteristic of said last mentioned image, and rendering said other deflection circuit operative.

2. The method of adjusting a television receiver which includes the steps of energizing the receiver; disabling the horizontal sweep circuit, thereby producing a vertical line on the screen of the receiver; adjusting the characteristics of said vertical line; rendering the horizontal sweep circuit operative; disabling the vertical sweep circuit, thereby producing a horizontal line on the television screen; adjusting the characteristics of said horizontal line; and rendering the vertical sweep circuit operative.

3. In a television receiver including a cathode ray tube, associated sweep circuits having horizontal and vertical deflection coils respectively, and a flyback type high voltage supply; means for individually disabling said sweep circuits; an inductive element; and means for substituting said inductive element for said horizontal deflection coil upon disabling of said horizontal sweep circuit.

4. In a television receiver of the type employing a cathode ray tube, associated vertical and horizontal deflection coils, and a flyback type high voltage supply; a vertical sweep circuit coupled to said vertical deflection coil; a horizontal sweep circuit coupled to said horizontal deflection coil and to said flyback type high voltage supply; means for interrupting the connection between said vertical sweep circuit and said vertical deflection coil; means for interrupting the connection between said horizontal deflection coil and said horizontal sweep circuit, and means for substituting an inductive element for said horizontal deflection coil upon interruption of said last mentioned connection.

5. The method of claim 1 wherein said characteristics are position of said images, and further including the step of adjusting the size of said images.

6. The method of adjusting an image reproducer having a pair of deflection circuits arranged to produce a two-dimensional image, which includes the steps of individually disabling said deflection circuits thereby producing substantially uni-dimensional images, and individually adjusting characteristics of said uni-dimensional images.

7. The method of adjusting an image viewer having a screen and a pair of elements for scanning said screen in two dimensions, which comprises disabling one of said elements thereby producing a substantially uni-dimensional pattern on said screen, adjusting characteristics of said pattern, enabling said one element, disabling the other element thereby producing a substantially uni-dimensional pattern on said screen, adjusting characteristics of said last mentioned pattern, and enabling said other element.

8. The method of adjusting an image viewer having a screen and a pair of elements for scanning said screen in two dimensions, which comprises preventing one of said elements from scanning said screen thereby producing a uni-dimensional pattern on said screen, adjusting said pattern, allowing said one element to scan said screen, preventing said other element from scanning said screen thereby producing a second uni-dimensional pattern on said screen, adjusting said second pattern, and allowing said other element to scan said screen, whereby a properly adjusted two dimensional pattern is produced on said screen.

References Cited in the file of this patent

UNITED STATES PATENTS

| | | |
|---|---|---|
| 2,241,256 | Gould | May 6, 1941 |
| 2,249,943 | Campbell | July 22, 1941 |
| 2,350,069 | Schrader et al. | May 30, 1944 |
| 2,510,670 | Trott | June 6, 1950 |

FOREIGN PATENTS

| | | |
|---|---|---|
| 610,910 | Great Britain | Oct. 22, 1948 |

OTHER REFERENCES

Anderson: Abstract No. 783,199, published Nov. 14, 1950.

Rider Television Manual, vol. 2, September 6, 1949, R. C. A. Model 648PV Schematic, pages 2-109 and 110.